(12) United States Patent
Murai et al.

(10) Patent No.: US 12,057,726 B2
(45) Date of Patent: Aug. 6, 2024

(54) CHARGE-DISCHARGE CONTROL METHOD AND CHARGE-DISCHARGE CONTROL DEVICE

(71) Applicants: NISSAN MOTOR CO., LTD., Yokohama (JP); RENAULT s.a.s., Boulogne-Billancourt (FR)

(72) Inventors: Kensuke Murai, Kanagawa (JP); Keigo Ikezoe, Kanagawa (JP); Kenta Suzuki, Kanagawa (JP)

(73) Assignees: NISSAN MOTOR CO., LTD., Yokohama (JP); RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 18/276,560

(22) PCT Filed: Feb. 10, 2021

(86) PCT No.: PCT/IB2021/000082
§ 371 (c)(1),
(2) Date: Aug. 9, 2023

(87) PCT Pub. No.: WO2022/172044
PCT Pub. Date: Aug. 18, 2022

(65) Prior Publication Data
US 2024/0097467 A1  Mar. 21, 2024

(51) Int. Cl.
*H02J 7/00* (2006.01)

(52) U.S. Cl.
CPC .......... *H02J 7/0068* (2013.01); *H02J 7/0048* (2020.01)

(58) Field of Classification Search
USPC ................................................ 320/128, 109
See application file for complete search history.

(56) References Cited

U.S. PATENT DOCUMENTS

| 11,069,927 B2 | 7/2021 | Yokoyama et al. |
| 11,390,186 B2 | 7/2022 | Murai et al. |
| | (Continued) | |

FOREIGN PATENT DOCUMENTS

| EP | 4 293 604 A1 | 12/2023 |
| JP | 2009-112148 A | 5/2009 |
| | (Continued) | |

OTHER PUBLICATIONS

U.S. Appl. No. 18/276,614, filed Aug. 9, 2023, Nissan Motor Co., Ltd.; Renault S.A.S.

(Continued)

*Primary Examiner* — Samuel Berhanu
(74) *Attorney, Agent, or Firm* — Foley & Lardner LLP

(57) ABSTRACT

The power reception control device is configured to: acquire information indicating differential power obtained by subtracting a current value of total transmission power transmitted to an entirety of a load group via a power supply base point, from a maximum value of the total transmission power transmittable to the entirety of the load group via the power supply base point; calculate element differential power of an own power receiving element by multiplying the differential power indicated by the acquired information by a priority of the own power receiving element, the priority indicating a degree to which power reception of the own power receiving element takes priority over power reception of another power receiving element; and control charging-discharging of the own power receiving element based on the element differential power and a charge-discharge schedule of a power system.

6 Claims, 6 Drawing Sheets

(56) References Cited

U.S. PATENT DOCUMENTS

| | | |
|---|---|---|
| 11,843,271 B2 | 12/2023 | Murai et al. |
| 2011/0241647 A1 | 10/2011 | Hershey et al. |
| 2013/0119947 A1 | 5/2013 | Ishida et al. |
| 2015/0357854 A1 | 12/2015 | Watanabe |
| 2016/0274607 A1 | 9/2016 | Kudo et al. |
| 2017/0010595 A1* | 1/2017 | Kawaguchi ....... H02J 13/00034 |
| 2017/0018923 A1* | 1/2017 | Rombouts ............. G06Q 50/06 |
| 2022/0153163 A1 | 5/2022 | Murai et al. |
| 2022/0158470 A1 | 5/2022 | Murai et al. |

FOREIGN PATENT DOCUMENTS

| | | |
|---|---|---|
| JP | 2011-217600 A | 10/2011 |
| JP | 2012-039685 A | 2/2012 |
| JP | 2012-257436 A | 12/2012 |
| JP | 2013-172537 A | 9/2013 |
| JP | 2014-090586 A | 5/2014 |
| JP | 5598896 B2 | 10/2014 |
| JP | 2015-057936 A | 3/2015 |
| JP | 2016-015875 A | 1/2016 |
| JP | 6168528 B2 | 7/2017 |
| JP | 2017-158363 A | 9/2017 |
| JP | 2018-064458 A | 4/2018 |
| JP | 2018-160821 A | 10/2018 |
| WO | WO-2020/194009 A1 | 10/2020 |
| WO | WO-2020/194010 A1 | 10/2020 |

OTHER PUBLICATIONS

U.S. Appl. No. 18/276,577, filed Aug. 9, 2023, Nissan Motor Co., Ltd.; Renault S.A.S.

U.S. Appl. No. 18/276,602, filed Aug. 9, 2023, Nissan Motor Co., Ltd.; Renault S.A.S.

* cited by examiner

FIG. 6

| | STATE | STATE OF OWN VEHICLE WILL VEHICLE REACH DESIRED SOC? | STATE OF OTHER VEHICLES | CONTROL CONTENT |
|---|---|---|---|---|
| 1 | CHARGING | EXPECTED TO REACH | ALL OTHER VEHICLES ARE EXPECTED TO REACH DESIRED SOC | DISCHARGING NOT PERFORMED (BASICALLY PERFORM CHARGING) |
| 2 | CHARGING | EXPECTED TO REACH | THERE ARE OTHER VEHICLES THAT ARE NOT EXPECTED TO REACH DESIRED SOC | PERFORM DISCHARGING |
| 3 | CHARGING | NOT EXPECTED TO REACH | ALL OTHER VEHICLES ARE EXPECTED TO REACH DESIRED SOC | PERFORM CHARGING |
| 4 | CHARGING | NOT EXPECTED TO REACH | THERE ARE OTHER VEHICLES THAT ARE NOT EXPECTED TO REACH DESIRED SOC | DISCHARGING NOT PERFORMED (BASICALLY PERFORM CHARGING) |
| 5 | DISCHARGING | EXPECTED TO REACH | ALL OTHER VEHICLES ARE EXPECTED TO REACH DESIRED SOC | CHARGING NOT PERFORMED (BASICALLY PERFORM DISCHARGING) |
| 6 | DISCHARGING | EXPECTED TO REACH | THERE ARE OTHER VEHICLES THAT ARE NOT EXPECTED TO REACH DESIRED SOC | PERFORM DISCHARGING |
| 7 | DISCHARGING | NOT EXPECTED TO REACH | ALL OTHER VEHICLES ARE EXPECTED TO REACH DESIRED SOC | PERFORM CHARGING |
| 8 | DISCHARGING | NOT EXPECTED TO REACH | THERE ARE OTHER VEHICLES THAT ARE NOT EXPECTED TO REACH DESIRED SOC | PERFORM CHARGING IF THERE IS NO OTHER VEHICLE THAT IS PERFORMING DISCHARGING AMONG OTHER VEHICLES THAT WILL NOT REACH DESIRED SOC. CHARGING NOT PERFORMED IF THERE IS OTHER VEHICLE THAT IS PERFORMING DISCHARGING. |

CHARGE-DISCHARGE CONTROL METHOD AND CHARGE-DISCHARGE CONTROL DEVICE

TECHNICAL FIELD

The present invention relates to a charge-discharge control method and a charge-discharge control device.

BACKGROUND ART

There is a prior known method of controlling the power consumption of each of a plurality of power consumption elements based on a limit for the total power consumption consumed by the entire group including the power consumption elements (Patent Literature 1). In Patent Literature 1, a broadcast transmission element broadcasts, to the group, a function of the difference between a current value for the total power consumption and a reference value for the total power consumption. Each power consumption element controls its own power consumption by using the function and the priority given to that element.

CITATION LIST

Patent Literature

Patent Literature 1: Japanese Patent No. 6168528

SUMMARY OF INVENTION

Technical Problem

However, in the invention disclosed in Patent Literature 1, control is not performed that is based on a charge-discharge schedule of a smart grid (a power grid that controls power from both supply and demand sides and optimizes the power).

The present invention has been devised in view of the above problems, and an object of the present invention is to provide a charge-discharge control method and a charge-discharge control device capable of efficiently controlling charging-discharging.

Solution to Problem

A charge-discharge control method according to an aspect of the present invention includes: acquiring information indicating differential power obtained by subtracting a current value of total transmission power transmitted to an entirety of a load group via a power supply base point, from a maximum value of the total transmission power transmittable to the entirety of the load group via the power supply base point; calculating element differential power of an own power receiving element by multiplying the differential power indicated by the acquired information by a priority of the own power receiving element, the priority indicating a degree to which power reception of the own power receiving element takes priority over power reception of another power receiving element; and controlling charging-discharging of the own power receiving element based on the element differential power and a charge-discharge schedule of a power system.

Advantageous Effects

According to the present invention, charging-discharging can be efficiently controlled.

BRIEF DESCRIPTION OF DRAWINGS

FIG. 6 is a table for explaining control based on the state of charge of other electric vehicles.

DESCRIPTION OF EMBODIMENTS

Figure 1:
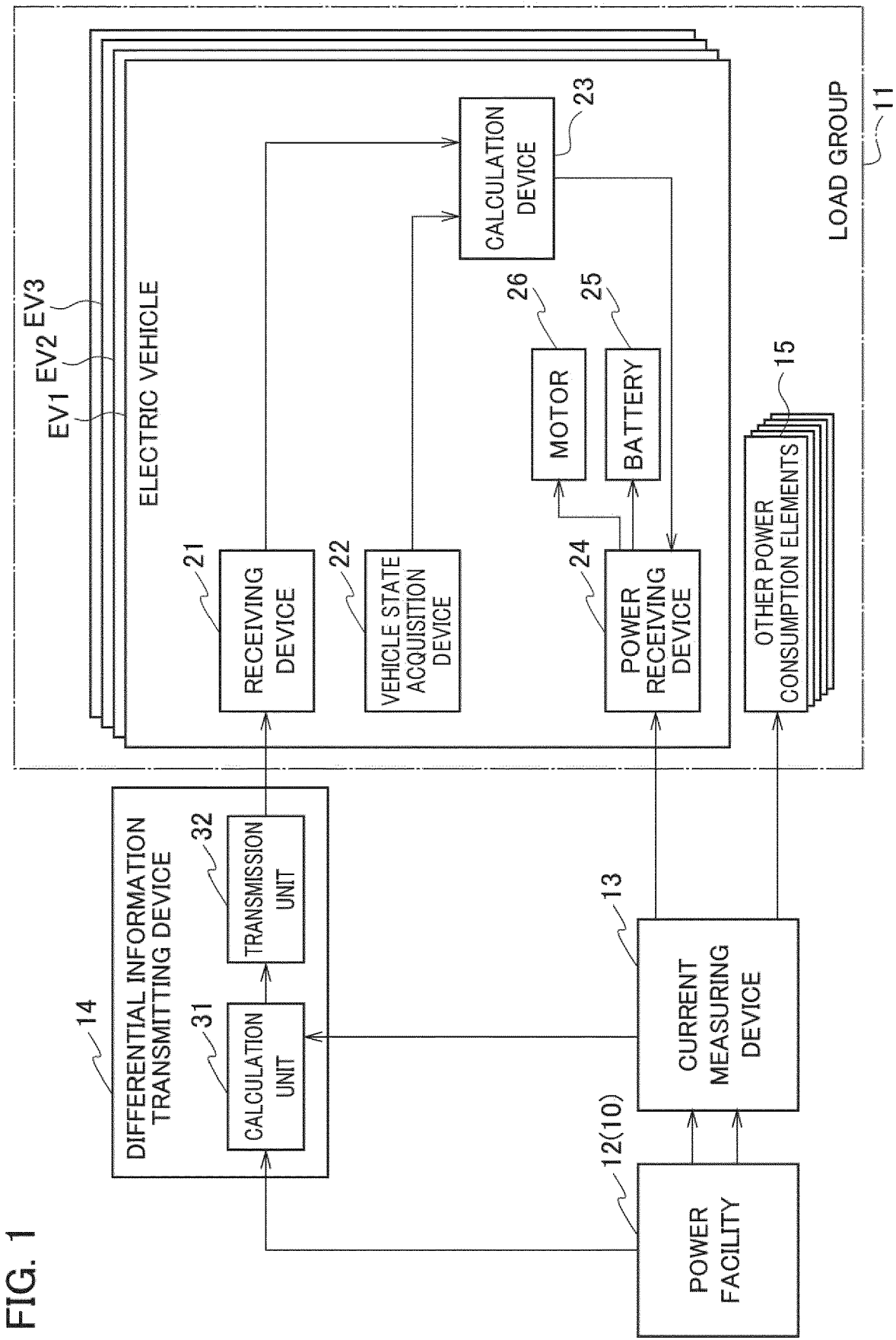
FIG. 1 is a schematic configuration diagram of a power system according to an embodiment of the present invention.

An embodiment of the present invention will be described below with reference to the drawings. In the illustrations of the drawings, the same parts are denoted with the same reference numerals, and the description thereof is omitted.

With reference to FIG. 1, the configuration of a power reception control device and peripheral devices thereof in an electric vehicle (an example of a power receiving element) according to the present embodiment will be described. In a power system that supplies electric energy to a load group 11 including a plurality of electric vehicles (EV1, EV2, EV3, and so forth) via a power facility 12 (an example of a power supply base point 10), the power reception control device controls an element received power, which is the power received by the electric vehicle EV1 included in the load group 11, by repeating a prescribed processing cycle.

The power reception control device has a receiving device 21 that receives electric signals from the outside, a vehicle state acquisition device 22 that acquires information indicating the state of the electric vehicle EV1, and a calculation device 23 that calculates the element received power of the electric vehicle EV1. The electric vehicle EV1 includes a power receiving device 24 that receives power from the outside, a battery 25 that stores the power (element received power) received by the power receiving device 24, and a motor 26 that is driven based on the electric energy or element received power stored in the battery 25.

The "processing cycle" includes processing steps of (a) to (e).

(a) The receiving device 21 acquires information indicating differential power ($\Delta P$) which is obtained by subtracting the current value (Pall_now) of the total transmission power transmitted to the entire load group 11 via the power facility 12, from the maximum value (Pall_max) of the total transmission power that can be transmitted to the entire load group 11 via the power facility 12.

(b) The calculation device 23 calculates a priority ($\beta$) of the electric vehicle EV1 indicating the degree to which power reception of the own vehicle (the electric vehicle EV1) is given priority over power reception of other electric vehicles (EV2, EV3, and so forth), based on a numerical value representing a request of the user of the electric vehicle EV1.

(c) The calculation device 23 calculates element differential power ($\beta \Delta P$) by multiplying the differential power ($\Delta P$) indicated by the acquired information, by the priority ($\beta$).

(d) The calculation device 23 updates the element received power (Pt+1) by adding the element differential power ($\beta\Delta P$) to the element received power (Pt) of the previous processing cycle.

(e) The calculation device 23 controls the electric vehicle EV1 to receive the updated element received power (Pt+1).

In the present embodiment, an "electric vehicle" is an example of a "power storage element" or a "power receiving element" that receives power transferred via the power facility 12. A power storage element stores received power in a battery (including secondary batteries, storage batteries, and rechargeable batteries). A "power storage element" includes all equipment and devices with batteries such as vehicles (including electric vehicles, hybrid vehicles, construction equipment, and agricultural equipment), railroad cars, playground equipment, tools, household products, and daily necessities.

A "power storage element" is an example of a "power receiving element" that receives power transferred via the power facility 12. A "power receiving element" includes a "power consumption element" that consumes received power without storing the power, in addition to the "power storage element". A "power consumption element" includes railroad cars, playground equipment, tools, household products, daily necessities, and the like. A "power consumption element" may include a battery, similar to an electric vehicle. In the case where the power received by an electric vehicle is not stored in a battery but is directly transferred to a motor and consumed as driving power of the motor, the electric vehicle is an example of a "power consumption element". In this way, the "power consumption element" includes all equipment and devices that consume received power without storing the power regardless of whether a battery is provided.

Both a "power storage element" and a "power receiving element" represent a constituent unit of power reception control performed by the power reception control device. That is, the power reception control according to the present embodiment is performed by using a power storage element or a power receiving element as a unit. The power reception control according to the present embodiment is performed independently and in parallel for each of the plurality of electric vehicles (EV1, EV2, EV3, and so forth), for example.

In the present embodiment, a power storage element is given as an example of a power receiving element, and an electric vehicle (EV) that travels by using electricity as an energy source and the motor 26 as a power source is given as an example of a power storage element. However, this is not intended to limit both the power receiving element and power storage element in the present invention to electric vehicles (EVs).

In the present embodiment, the "power facility 12" is an example of the power supply base point 10. The "power facility 12" includes the following <1> to <6>, for example.

<1>"Charging stations" for electric vehicles EV

<2>"Power transformation devices" installed in sites such as parking areas of residences, office buildings, commercial facilities, factories, or highways <3>"Power plants" such as hydro, thermal, or nuclear power plants, or "substations" that convert generated power to prescribed voltages <4> Various "distribution facilities" for distributing power transferred via substations <5>"Wiring (including cables and feeders)" connecting between these devices or facilities <6>"Virtual power plants (VPP)" that aggregate the energy of nearby small power storage elements and make them function as one large power plant In the present embodiment, a description will be given regarding an example in which the power reception control device is mounted on the electric vehicle EV1, but it goes without saying that the power reception control device may control the element received power of the electric vehicle EV1 from outside the electric vehicle EV1 by using a short-range radio communication technology such as short-range wireless, wireless LAN, and wireless WAN, or a mobile phone communication network.

In addition, the configuration of one electric vehicle EV1 among the plurality of electric vehicles (EV1, EV2, EV3, and so forth) included in the load group 11 is described as an example, but other electric vehicles (EV2, EV3, and so forth) included in the load group 11 also have the same configuration as the electric vehicle EV1.

The power reception control device controls the power received by the electric vehicle EV1 via the power facility 12. The electric vehicle EV1 has the power receiving device 24 called an on-board charger (OBC). The calculation device 23 controls the power received by the power receiving device 24 via the power facility 12. The power received by the power receiving device 24 is stored in the battery 25. Alternatively, the electric vehicle EV1 may not store the power received by the power receiving device in the battery 25 but directly transfer the power to the motor 26 as a driving source.

The power supplied to the electric vehicle EV1 via the power facility 12 is measured by a current measuring device 13. A power value measured by the current measuring device 13 is transmitted to a differential information transmitting device 14.

The electric energy is supplied to the plurality of electric vehicles (EV1, EV2, EV3, and so forth) included in the load group 11 via one power facility 12. In addition, the electric energy may be supplied not only to the plurality of electric vehicles (EV1, EV2, EV3, and so forth) but also to one or two or more other power consumption elements 15 included in the load group 11 via one power facility 12. The plurality of electric vehicles (EV1, EV2, EV3, and so forth) and one or two or more other power consumption elements 15 to which the electric energy is supplied via the power facility 12 form a group (the load group 11).

The current measuring device 13 measures the current value (Pall_now) of the total transmission power that is transmitted to all electric vehicles (EV1, EV2, EV3, and so forth) and other power consumption elements 15 that are included in one load group 11 via the power facility 12, in other words, the total transmission power of the load group 11 as a whole.

The total power capacity of the load group 11, that is, the maximum value (Pall_max) of the total transmission power that can be transmitted to the entire load group 11 via the power facility 12, is determined in advance. The power reception control device according to the present embodiment controls the element received power of the electric vehicle EV1 based on a limit for the maximum value (Pall_max) of the total transmission power. The power reception control device controls the receiving power of the electric vehicle EV1 such that the current value (Pall_now) of the total transmission power measured by the current measuring device 13 does not exceed the maximum value (Pall_max) of the power, for example. It is needless to say that the power reception control device may control the receiving power of the electric vehicle EV1 to allow the current value (Pall_now) of the total transmission power to temporarily exceed the maximum value (Pall_max) of the power. The maximum value (Pall_max) of the total transmission power may or may not be a fixed value. Within facilities such as office buildings, commercial facilities, factories, and highway parking areas, there are not only charging stations for electric vehicles EVs but also power-consuming devices in facilities such as lighting devices, air conditioning devices, and lifting devices. The maximum value of the total transmission power may vary depending on these facilities.

As shown in FIG. 1, in the present embodiment, the differential information transmitting device 14 is communicably connected to each of the power facility 12, the current measuring device 13, and the electric vehicle EV1 in a wired or wireless manner. The power facility 12 transmits an electric signal indicating the maximum value (Pall_max) of the total transmission power to the differential information transmitting device 14. The current measuring device 13 transmits an electric signal indicating the current value (Pall_now) of the measured total transmission power to the differential information transmitting device 14.

The differential information transmitting device 14 includes a calculation unit 31 and a transmission unit 32. The calculation unit 31 calculates the differential power (ΔP) by subtracting the current value (Pall_now) of the total transmission power from the maximum value (Pall_max) of the total transmission power as shown in formula (1). The transmission unit 32 transmits (broadcasts) an electric signal indicating the differential power (ΔP) to all electric vehicles (EV1, EV2, EV3, and so forth) included in the load group 11 by means of mobile communication. The electric signal indicating the differential power (ΔP) is received by the receiving device 21 and transferred to the calculation device 23. This enables the power reception control device to acquire information indicating the differential power (ΔP) which is obtained by subtracting the current value (Pall_now) of the total transmission power being transmitted to the entire load group 11 via the power facility 12 from the maximum value (Pall_max) of the total transmission power that can be transmitted to the entire load group 11 via the power facility 12.

$$\Delta P = P_{all\_max} - P_{all\_now} \quad \text{[Formula 1]}$$

The differential information transmitting device 14 uses the transmission unit 32 to transmit (broadcast) information indicating the differential power (ΔP) to the receiving devices 21 of all electric vehicles (EV1, EV2, EV3, and so forth) included in the load group 11 by means of by wireless communication. Alternatively, wired communication may be used to transmit information indicating the differential power (ΔP).

In the example shown in FIG. 1, the differential information transmitting device 14 may not have a receiving device that receives signals transmitted from each electric vehicle indicating the state of each electric vehicle, such as the state of charge (SOC) of the battery 25 or the time (Ta) at which power reception is to end. That is, it is sufficient if the differential information transmitting device 14 and each electric vehicle can communicate only in one direction from the differential information transmitting device 14 to each electric vehicle. Note that two-way communication is also possible.

The differential information transmitting device 14 may be a server connected to the power facility 12, the current measuring device 13, and the load group 11 via a computer network, for example. Alternatively, the differential information transmitting device 14 may be configured as a part of the power facility 12.

The vehicle state acquisition device 22 acquires information indicating the state of the electric vehicle EV1. The "state of the electric vehicle EV1" is a numerical value indicating a request of the user of the electric vehicle EV1, for example. The numerical value indicating a request of the user of the electric vehicle EV1 is the remaining time (T) until the time when the power reception of the electric vehicle EV1 is to end (the power reception end time $T_d$). The remaining time (T) can be calculated from the time when the electric vehicle EV1 is to end the power reception. The remaining time (T) is the remaining time during which the battery 25 of the electric vehicle EV1 can be charged.

Suppose that a user who has returned home starts charging the battery 25 of the electric vehicle EV1 in a parking space of his/her home and plans to go out by using the electric vehicle EV1 at 7:00 AM the next day. In the above case, a time that is a prescribed time period (5 minutes) before 7:00 AM the next day can be set as the power reception end time. In this way, the "user's request" to "go out at 7:00 AM the next day" represents the power reception end time (6:55 AM=$T_d$) and the remaining time (T) until the power reception end time. The "power reception end time ($T_d$)" means the time at which a time period during which the electric vehicle EV1 can continue receiving power is to end, and is distinguished from the time at which the user determines, in the power reception control flow (FIG. 2), to not continue power reception (NO in S03).

The power reception end time ($T_d$) may be a time that is actually set by the user using an information communication terminal such as a smartphone or a user interface mounted on the electric vehicle EV1. Alternatively, if there is no specific instruction or setting from the user, the time may be estimated from statistical data obtained by investigating the user's past behavior history (history of past departure times and the like).

The calculation device 23 calculates the priority (β) of the electric vehicle EV1, which indicates the degree to which power reception of own EV1 is prioritized over power reception of other electric vehicles (EV2, EV3, and so forth), based on a numerical value indicating a request of the user of the electric vehicle EV1 (the state of the electric vehicle EV1). Specifically, the calculation device 23 calculates the priority (β) from the remaining time (T) from the current time ($T_o$) to the power reception end time ($T_d$) by using formula (2). In formula (2), N indicates the total number of electric vehicles that receive power in the load group 11.

[Formula 2]

$$\beta = \frac{1}{N \times (T_d - T_0)} \quad (2)$$

As shown in formula (2), the priority (β) is inversely proportional to the remaining time (T). As the remaining time (T) decreases, the priority (β) increases. Formula (2) is only an example, and the priority (β) may be inversely proportional to the "remaining time (T) raised to the power of g", which is the product of the remaining time (T) multiplied g times (g is a positive number) which is two or more times.

The total number (N) of electric vehicles may be statistical data (quantitative data) obtained by investigating the past history of power reception in the load group 11, or an approximate total number (N) of electric vehicles can be estimated from the current power value (Pall_now). The total number (N) is transmitted from the differential information transmitting device 14 or a device associated with the differential information transmitting device 14 in the same broadcast in the same manner as the differential power (ΔP). Alternatively, the total number (N) may be specified by using position information or an identification signal of a charging system.

As shown in formula (3), the calculation device 23 calculates the element differential power (βΔP) by multiplying the differential power (ΔP) by the priority (β), and updates the elemental receiving power (Pt+1) by adding the element differential power (βΔP) to the elemental receiving power (Pt) of the previous processing cycle. Note that the subscript (lower-right characters) "t" and "t+1" of the symbol "P" indicating the elemental receiving power indicates the number of repetitions of the "processing cycle", and t is a positive integer including zero.

$$P_{t+1} = P_t + \beta \cdot \Delta P \qquad (3)$$

The calculation device 23 transmits an instruction signal to the power receiving device 24 such that the power receiving device 24 receives the updated element received power (Pt+1), and the power receiving device 24 that has received the instruction signal receives the updated element received power (Pt+1) via the power facility 12.

The power reception control device controls power (element received power Pt) received by the power receiving device 24 of the electric vehicle EV1 by repeatedly performing a "processing cycle" including processing steps of (a) to (e) at fixed periods.

Figure 2:
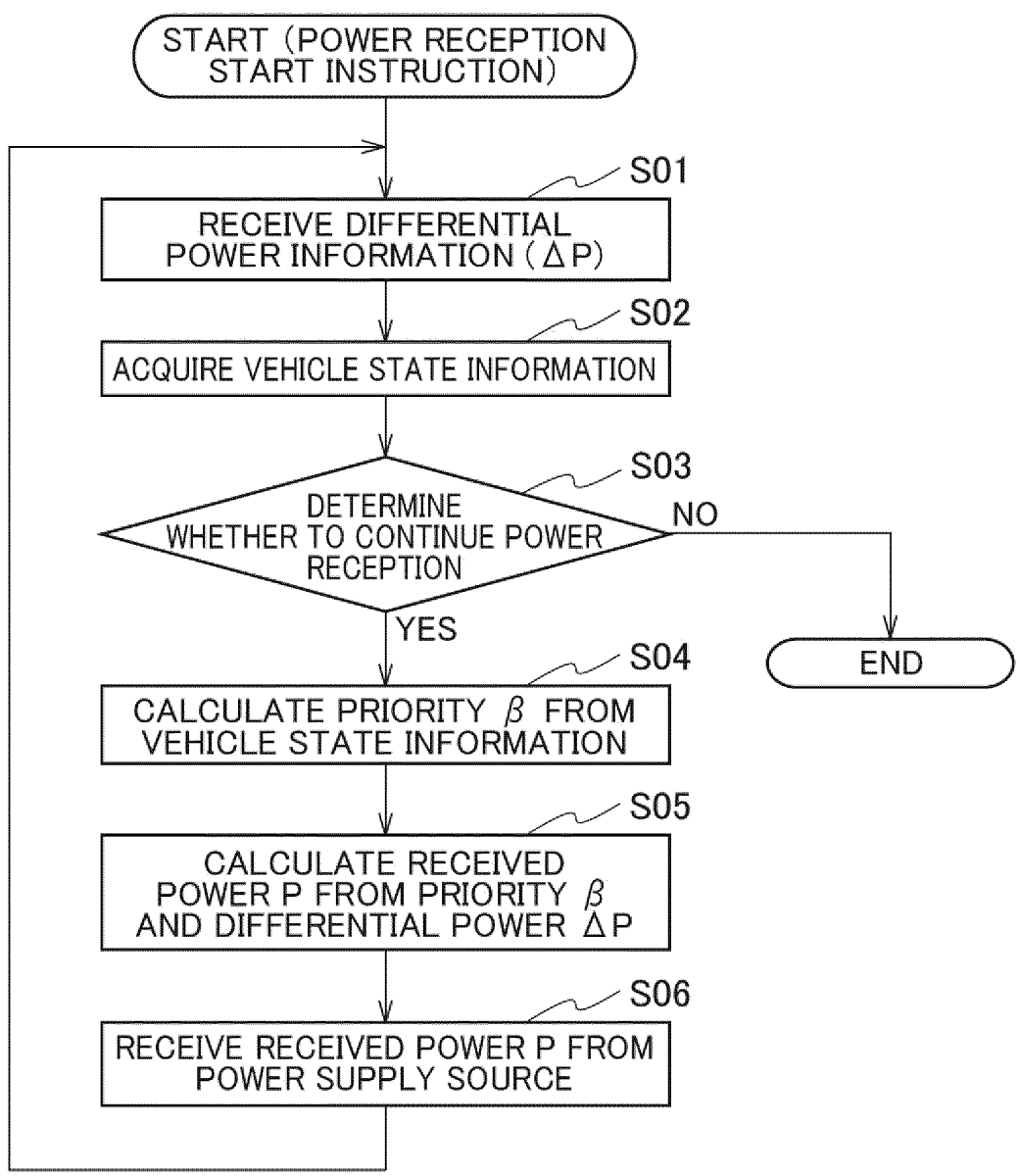
FIG. 2 is a flowchart for explaining an operation example of a power reception control device.

Next, an example (a basic example) of a power receiving control method performed by the power reception control device shown in FIG. 1 will be described with reference to the flowchart of FIG. 2. A person skilled in the art can easily understand the specific procedure of the power receiving processing method performed by the power reception control device from the description of the specific configuration and functions of the power reception control device shown in FIG. 1. Therefore, the main processing operation of the power reception control device is described here as the power receiving processing method performed by the power reception control device shown in FIG. 1, and descriptions of detailed processing operations will be omitted because they overlap with the descriptions made with reference to FIG. 1.

First, in step S01, the receiving device 21 acquires information indicating the differential power (ΔP) calculated by the calculation unit 31. Processing proceeds to step S02, and the vehicle state acquisition device 22 acquires information indicating the power reception end time ($T_d$) as an example of information indicating the state of the electric vehicle EV1.

Processing proceeds to step S03, and the power reception control device determines whether to continue power reception. For example, if the device receives an instruction signal to end power reception from the user of the electric vehicle EV1 (NO in S03), or if the current time reaches the power reception end time ($T_d$), the device ends the continuation of power reception. Alternatively, if an unconnected charging port is detected (NO in S03), the device ends the continuation of power reception within a few minutes since there is an increase in the possibility that the electric vehicle EV1 will start moving. Further, if the state of charge (SOC) of the battery 25 reaches a target value (NO in S03), the device ends the continuation of power reception. If these situations do not arise (YES in S03), the power reception control device continues power reception.

Processing proceeds to step S04, and the calculation device 23 calculates the priority (β) of the electric vehicle EV1 from the power reception end time ($T_d$) by using formula (2). Processing proceeds to step S05, and the calculation device 23 updates the element received power (Pt+1) by substituting the differential power (ΔP) and priority (B) into formula (3).

Processing proceeds to step S06, and the calculation device 23 controls the power receiving device 24 such that the power receiving device 24 receives the updated element received power (Pt+1). The power reception control device controls the element received power (P) by repeatedly performing the processing cycle with steps S01 to S06 as a unit until NO is determined in step S03.

When the element received power (Pt+1) is updated, the updated element received power (Pt+1) may be corrected by subtracting a certain power correction value (αPt) from the previous element received power (Pt). This makes it difficult for the differential power (ΔP) to reach zero. This enables an electric vehicle to start receiving power at an early stage in the case where it is desired for the electric vehicle to start receiving power anew.

In the present embodiment, the power reception control device controls charging-discharging of the own electric vehicle based on a charge-discharge schedule of a smart grid. The smart grid is a power grid that controls power from both supply and demand sides and optimizes the power. A smart grid is sometimes referred to as a next-generation power distribution grid or a smart community. As an example of a smart grid, the smart grid is a power grid of a range including a power facility 10, the differential information transmitting device 14, the current measuring device 13, and the load group 11 shown in FIG. 1.

The charge-discharge schedule of the smart grid is not particularly limited, but in the present embodiment, a description will be given assuming that the schedule is set in advance. The charge-discharge schedule is set in advance based on peak power demand, off-peak power demand, nighttime power, and the like, for example.

The power reception control device acquires the charge-discharge schedule of the smart grid. The power reception control device acquires the charge-discharge schedule from the differential information transmitting device 14, for example. Then, the power reception control device controls charging-discharging of the own electric vehicle based on the charge-discharge schedule. In other words, the power system transmits a charge-discharge schedule to each electric vehicle. The power system prompts each electric vehicle to perform charging-discharging based on the charge-discharge schedule. This enables the power system to supply necessary power to many electric vehicles.

When each electric vehicle performs charging-discharging, conversion loss related to charging-discharging occurs. The conversion loss is loss related to AC-DC conversion or loss related to DC-AC conversion, for example. Hereinafter, "conversion loss related to charging-discharging" is referred to as "charge-discharge loss". It is desirable to reduce the charge-discharge loss when each electric vehicle performs charging-discharging.

Next, an example of a charge-discharge control method according to the present embodiment will be described with reference to FIGS. 3 to 6.

First, a comparative example will be described with reference to FIG. 3. The comparative example described here is a case where the charge-discharge control method according to the present embodiment is not used. The upper diagram of FIG. 3 will be described. The upper diagram shows the charge-discharge schedule of the smart grid. In the vertical axis of the upper diagram, positive values indicate the charging side. Negative values indicate the discharging side. The charging side indicates that the signal transmitted from the differential information transmitting device 14 is positive. In other words, the differential power (ΔP) is positive. Meanwhile, the discharging side indicates that the signal transmitted from the differential information transmitting device 14 is negative. That is, the differential power (ΔP) is negative. The horizontal axis shows the time. Reference numeral 40 indicates a value related to the charge-discharge schedule. Reference numeral 41 indicates a measured value.

The lower diagram of FIG. 3 will be described. The vertical axis of the lower diagram indicates the storage battery capacity (kWh) of an electric vehicle. The horizontal axis indicates the time. Reference numeral 51 indicates the storage battery capacity of EV1. Reference numeral 52 indicates the storage battery capacity of EV2. Reference numeral 53 indicates the storage battery capacity of EV3. Reference numeral 54 indicates the storage battery capacity of EV4. Reference numeral 61 indicates the storage battery capacity when EV1 departs. Reference numeral 62 indicates the storage battery capacity when EV2 departs. Reference numeral 63 indicates the storage battery capacity when EV3 departs. Reference numeral 64 indicates the storage battery capacity when EV4 departs. The storage battery capacity may be read as SOC.

Figure 3:
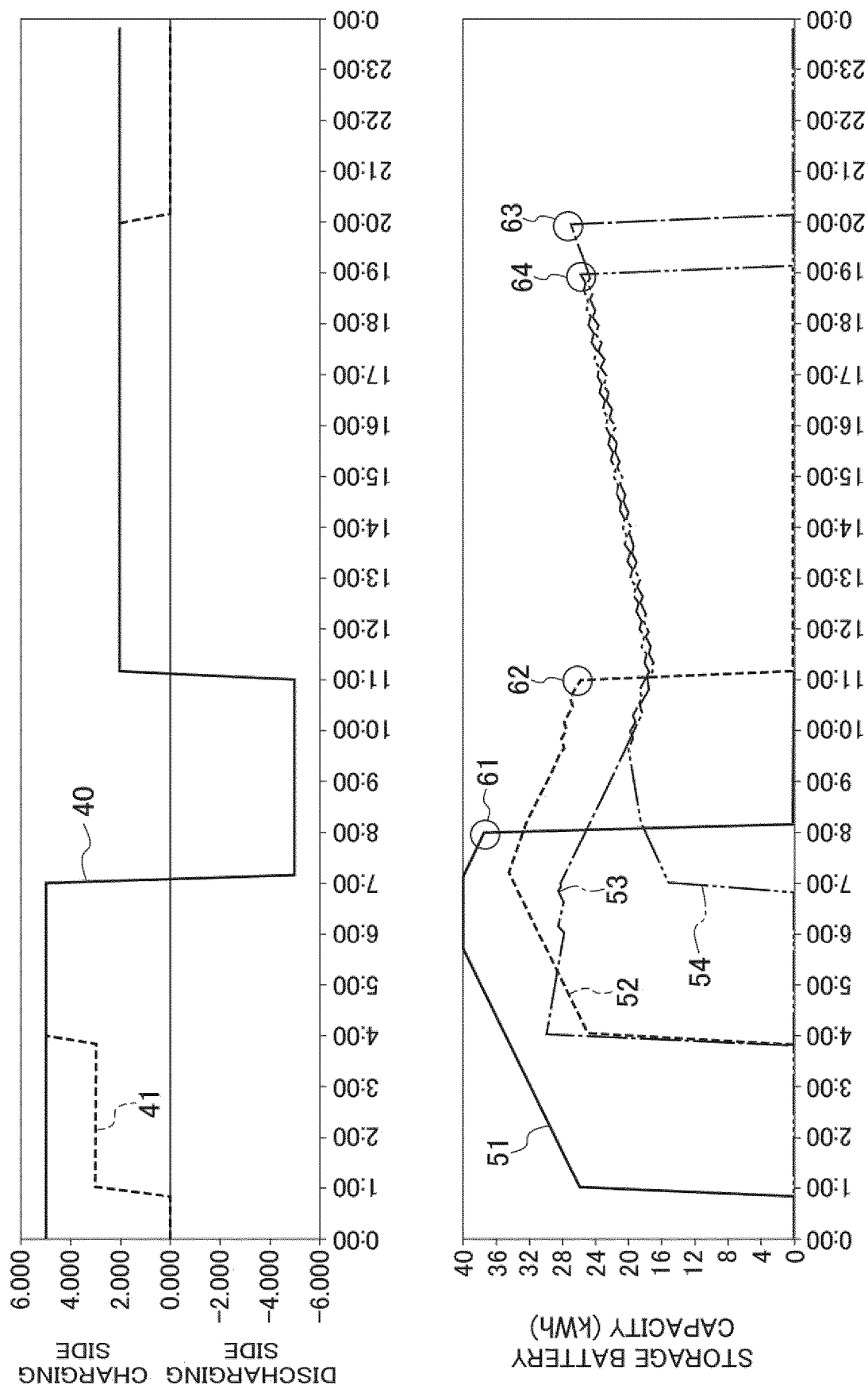
FIG. 3 is a graph for explaining a comparative example.

As shown in FIG. 3, in the charge-discharge schedule, chargeable power is high at night (time 0:00 to 7:00) when power demand is relatively low. Meanwhile, discharging is requested at a time period (time 7:00 to 11:00) when power demand is high. Compared to other EVs (EV2 to EV4), EV1 is charged during a time period when there is a large amount of chargeable power, and therefore the SOC at the time of departure is higher than that of other EVs. Meanwhile, EV2 to EV4 have a larger amount of discharge because they span a time period when discharging is in demand. For this reason, EV2 to EV4 depart with a lower SOC.

As an example of the charge-discharge control method, the priority (β) is given by using formula (4).

[Formula 4]

$$\text{Priority } (\beta) = \text{required power amount} - \Sigma(\text{estimated charged power}) \quad (4)$$

Figure 4:
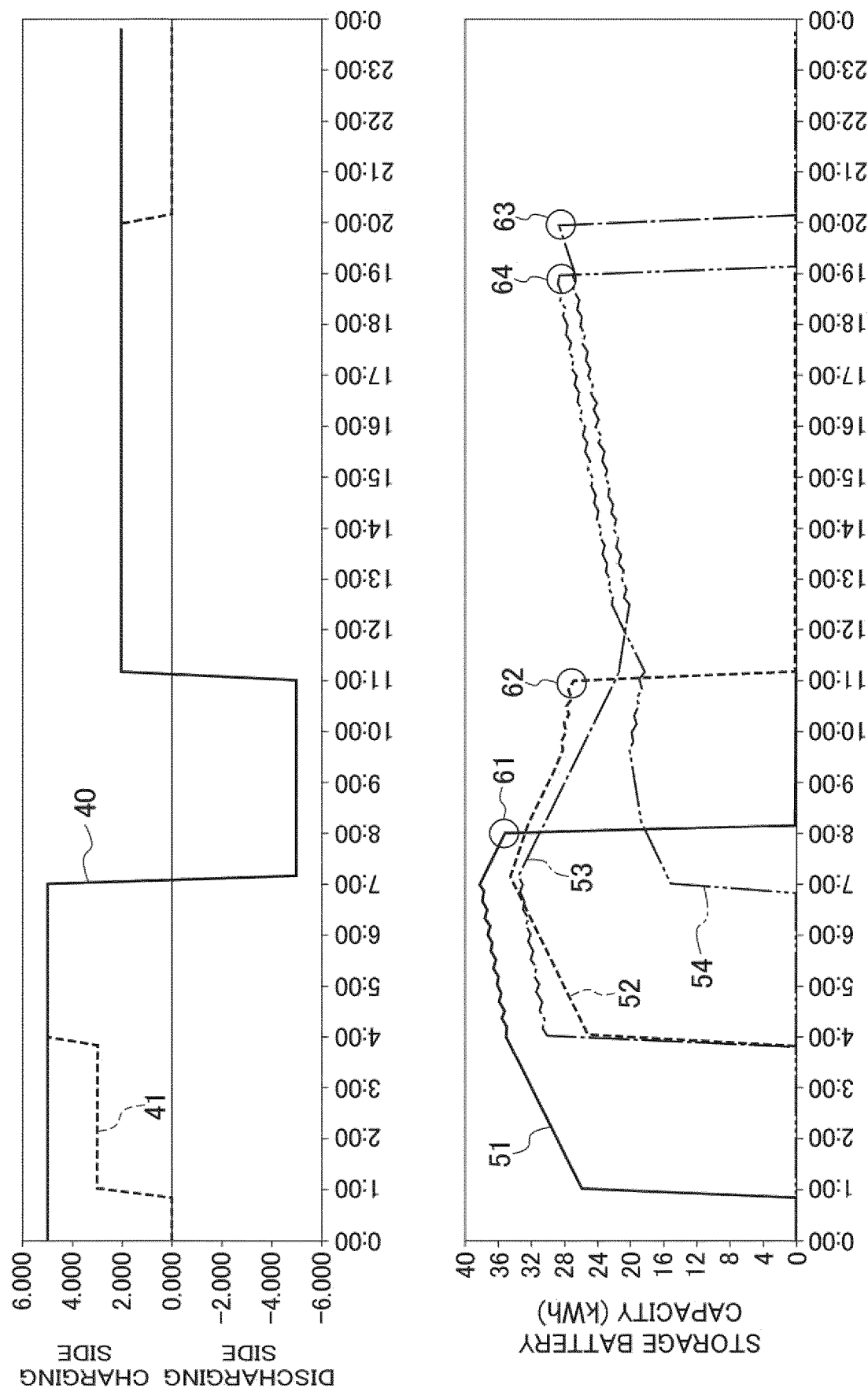
FIG. 4 is a graph for explaining SOC enhancement.

Since Σ (estimated charged power) takes the sum over time, it is a dimension of the power amount. The estimated charged power is transmitted from the differential information transmitting device 14, for example. The estimated charged power is obtained by dividing the total power amount usable by electric vehicles by the estimated number of electric vehicles staying. The estimated charged power corresponds to the expected charge amount per electric vehicle. The results using the priority (β) in relation to formula (4) will be described. An electric vehicle with a lower priority than the surrounding electric vehicles has a smaller charge amount. An electric vehicle with a higher priority than the surrounding electric vehicles has a larger charge amount. This enables EV2 to EV4 to depart with a higher SOC than that in FIG. 3, as shown in FIG. 4.

The priority (β) may be given by using formula (5).

[Formula 5]

$$\text{Priority } (\beta) = \Sigma(\text{estimated charged power}) - \text{required power amount} - (\text{power amount exceeding target power amount} \times 5) \quad (5)$$

Figure 5:
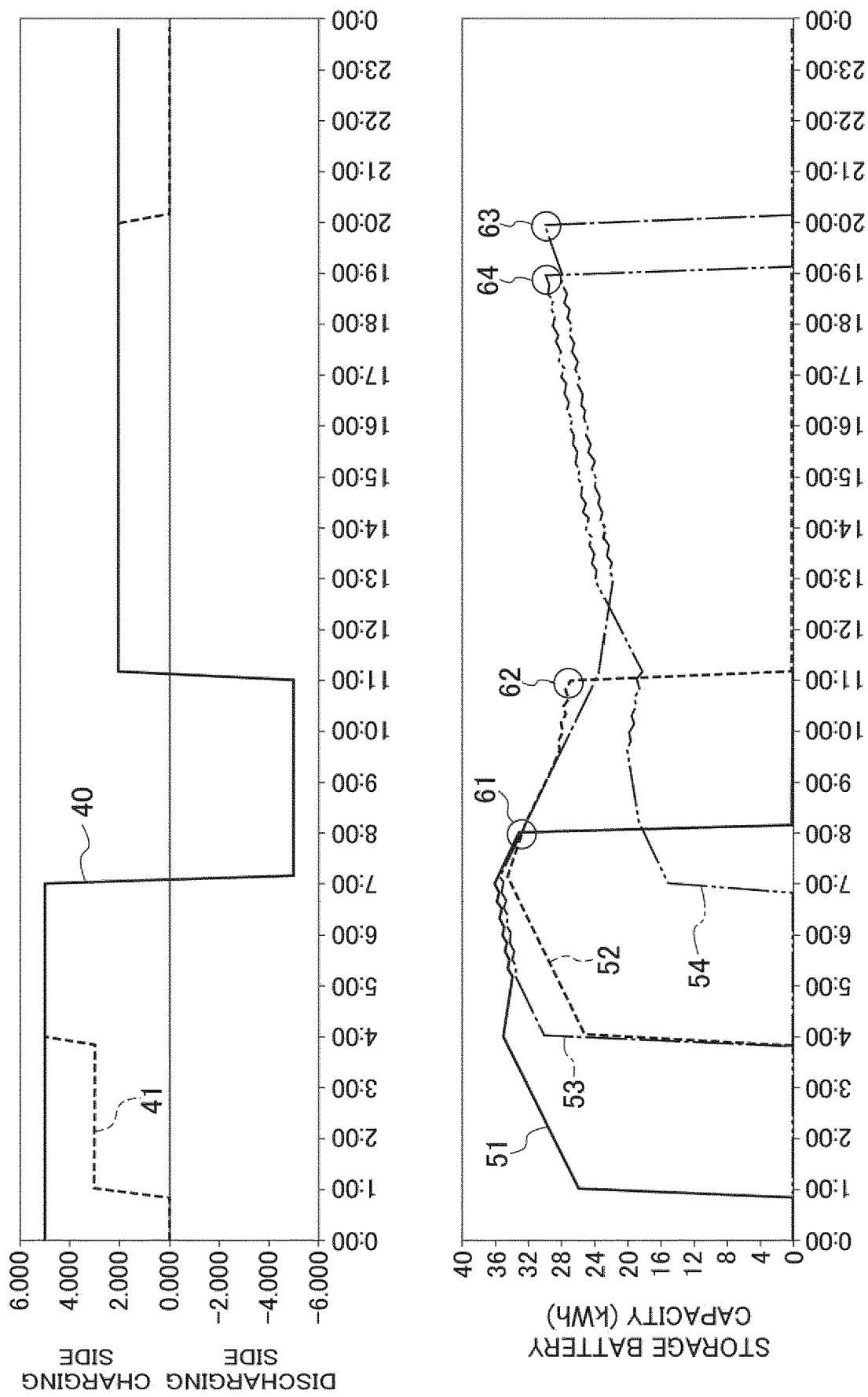
FIG. 5 is a graph for explaining SOC enhancement.

When the priority (β) according to formula (5) is used, as shown in FIG. 5, EV2 to EV4 can depart with a higher SOC than that in FIG. 3.

In addition, as another example of a charge-discharge control method, the power amount (charging-discharging amount) related to charging-discharging of the own vehicle may be controlled by estimating the SOC state of another electric vehicle. In the present embodiment, the own electric vehicle may not know the SOC state of another electric vehicle. Therefore, the power reception control device estimates the SOC state of another electric vehicle to control the power amount (charging-discharging amount) related to charging-discharging of the own vehicle. Specific examples will be described with reference to FIG. 6.

In FIG. 6, the "state" indicates whether the vehicle is in the charging side or in the discharging side in the charge-discharge schedule of the smart grid. Whether other electric vehicles are expected to reach the SOC desired by other electric vehicles (hereinafter referred to as "desired SOC") is estimated based on the amount of change in the differential power (ΔP). The SOC state of other electric vehicles is estimated for all cases (Cases 1 to 8).

First, Case 1 in FIG. 6 will be described. In Case 1, the state in the charge-discharge schedule is "charging". If charging is performed based on the charge-discharge schedule, the own electric vehicle is expected to reach the desired SOC. All other electric vehicles are expected to reach the desired SOC. In this case, the power reception control device basically performs charging based on the charge-discharge schedule. The power reception control device does not perform discharging. However, the device does not need to perform charging depending on the SOC state of other electric vehicles.

Next, Case 3 will be described. In Case 3, the state in the charge-discharge schedule is "charging". If charging is performed based on the charge-discharge schedule, the own electric vehicle is not expected to reach the desired SOC. All other electric vehicles are expected to reach the desired SOC. In this case, the power reception control device performs charging based on the charge-discharge schedule.

Case 4 will be described next. In Case 4, the state in the charge-discharge schedule is "charging". If charging is performed based on the charge-discharge schedule, the own electric vehicle is not expected to reach the desired SOC. There are other electric vehicles that are not expected to reach the desired SOC. In this case, the power reception control device basically performs charging based on the charge-discharge schedule. The power reception control device does not perform discharging.

Next, Case 5 will be described. In Case 5, the state in the charge-discharge schedule is "discharging". If discharging is performed based on the charge-discharge schedule, the own electric vehicle is expected to reach the desired SOC. All other electric vehicles are expected to reach the desired SOC. In this case, the power reception control device basically performs discharging based on the charge-discharge schedule. The power reception control device does not perform charging.

Next, Case 6 will be described. In Case 6, the state in the charge-discharge schedule is "discharging". If discharging is performed based on the charge-discharge schedule, the own electric vehicle is expected to reach the desired SOC. There are other electric vehicles that are not expected to reach the desired SOC. In this case, the power reception control device performs discharging based on the charge-discharge schedule.

As described above, in Cases 1 and 3 to 6, the power reception control device performs charging or discharging based on the charge-discharge schedule.

Next Case 2 will be described. In Case 2, the state in the charge-discharge schedule is "charging". If charging is performed based on the charge-discharge schedule, the own electric vehicle is expected to reach the desired SOC. There are other electric vehicles that are not expected to reach the desired SOC. In this case, the power reception control device does not perform control based on the charge-discharge schedule. The power reception control device performs discharging without regard to the charge-discharge schedule. This enables the own electric vehicle to supply power to other electric vehicles. This enables other electric vehicles to depart with a higher SOC.

Next, Case 7 will be described. In Case 7, the state in the charge-discharge schedule is "discharging". If discharging is performed based on the charge-discharge schedule, the own electric vehicle is not expected to reach the desired SOC. All other electric vehicles are expected to reach the desired SOC. In this case, the power reception control device does not perform control based on the charge-discharge schedule. The power reception control device performs charging without regard to the charge-discharge schedule. This enables the own electric vehicle to depart with a higher SOC.

Next, Case 8 will be described. In Case 8, the state in the charge-discharge schedule is "discharging". If discharging is performed based on the charge-discharge schedule, the own electric vehicle is not expected to reach the desired SOC. There are other electric vehicles that are not expected to reach the desired SOC. In this case, the power reception control device does not perform control based on the charge-discharge schedule. The power reception control device performs charging if there is no electric vehicle that is performing discharging among other electric vehicles that are not expected to reach the desired SOC. This enables the own electric vehicle to depart with a higher SOC. Further, the power reception control device does not perform charging if there is an electric vehicle that is performing discharging among other electric vehicles that are not expected to reach the desired SOC. The expression "does not perform charging" here means that charging using the power supplied from the power facility 12 is not performed. If there is an electric vehicle that is performing discharging among other electric vehicles that are not expected to reach the desired SOC, the power reception control device performs charging using the power discharged by other electric vehicle. This enables the own electric vehicle to depart with a higher SOC.

As described above, in Cases 2, 7, and 8, the power reception control device estimates the SOC state of other electric vehicles. Based on the estimation results, the power reception control device performs charge-discharge control without regard to the charge-discharge schedule. This enables the own electric vehicle or other electric vehicles to depart with a higher SOC. Further this also enables proper charge-discharge control and reduces the charge-discharge loss.

Operations and Effects

As described above, in accordance with the power reception control device (charge-discharge control device) according to the present embodiment, it is possible to obtain the following operations and effects.

The power reception control device controls the power received or discharged by the plurality of power receiving elements included in the load group 11, in a power system that supplies electric energy to the load group 11 including the power receiving elements via the power supply base point 10. The power reception control device acquires information indicating the differential power ($\Delta P$) obtained by subtracting the current value of the total transmission power transmitted to the entire load group 11 via the power supply base point 10, from the maximum value of the total transmission power that can be transmitted to the entire load group 11 via the power supply base point 10. The power reception control device calculates the element differential power of the power receiving element by multiplying the differential power ($\Delta P$) indicated by the acquired information by the priority ($\beta$) of the power receiving element, which indicates the degree to which power reception of the own power receiving element takes priority over the power reception of other power receiving elements. The power reception control device controls its own charging-discharging based on the element differential power and the charge-discharge schedule of the power system. This realizes efficient charge-discharge control using the charge-discharge schedule.

Further, the power reception control device estimates the state of charge of other power receiving elements. The power reception control device controls its own charging-discharging based on the estimated state of charge of other power receiving elements. In this way, basically the charge-discharge schedule is followed, but depending on the estimated state of charge of other power receiving elements, the power reception control device performs its own charge-discharge control without regard to the charge-discharge schedule. This enables proper charge-discharge control and reduces the charge-discharge loss.

Estimating the state of charge of another power receiving element means estimating whether the charge amount of the other power receiving element will reach the charge amount desired by the other power receiving element at the time when the other power receiving element will depart in the future.

The power system is the smart grid, for example.

Each of the functions described in the above embodiment can be implemented by one or more processing circuits. A processing circuit includes a programmed processing device such as a processing device including an electrical circuit. A processing circuit also includes devices such as an application specific integrated circuit (ASIC) and circuit components arranged to execute the described functions.

Although the embodiment of the invention has been described as described above, the discussion and drawings forming part of this disclosure should not be construed as limiting the invention. Various alternative embodiments, examples, operational techniques will be apparent to those skilled in the art from this disclosure.

For example,

REFERENCE SIGNS LIST

10 Power supply base point
11 Load group
13 Current measuring device
14 Differential information transmitting device
15 Power consumption element
21 Receiving device 22 Vehicle state acquisition device
23 Calculation device
24 Power receiving device
25 Battery
26 Motor
31 Calculation unit
32 Transmission unit

The invention claimed is:

1. A charge-discharge control method of controlling power received or discharged by power receiving elements included in a load group, in a power system that supplies electric energy to the load group including the power receiving elements via a power supply base point, the charge-discharge control method comprising:
   acquiring information indicating differential power obtained by subtracting a current value of total transmission power transmitted to an entirety of the load group via the power supply base point, from a maximum value of the total transmission power transmittable to the entirety of the load group via the power supply base point;
   calculating element differential power of a power receiving element by multiplying the differential power indicated by the acquired information by a priority of the power receiving element, the priority indicating a degree to which power reception of the power receiving element takes priority over power reception of another power receiving element;
   estimating a state of charge of the another power receiving element; and
   controlling charging-discharging of the power receiving element based on the element differential power, a charge-discharge schedule of the power system, and the estimated state of charge of the another power receiving element.

2. The charge-discharge control method according to claim 1, wherein estimating the state of charge of the another power receiving element comprises estimating whether a charge amount of the another power receiving element will reach a charge amount desired by the another power receiving element at a time when the another power receiving element will depart in the future.

3. The charge-discharge control method according to claim 1, wherein the power system is a smart grid.

4. A charge-discharge control device including a power reception control device that controls power received or discharged by power receiving elements included in a load group, in a power system that supplies electric energy to the load group including the power receiving elements via a power supply base point, wherein the power reception control device is configured to:
   acquire information indicating differential power obtained by subtracting a current value of total transmission power transmitted to an entirety of the load group via the power supply base point, from a maximum value of the total transmission power transmittable to the entirety of the load group via the power supply base point;
   calculate element differential power of a power receiving element by multiplying the differential power indicated by the acquired information by a priority of the power receiving element, the priority indicating a degree to which power reception of the power receiving element takes priority over power reception of another power receiving element;
   estimating a state of charge of the another power receiving element; and
   control charging-discharging of the power receiving element based on the element differential power, a charge-discharge schedule of the power system, and the estimated state of charge of the another power receiving element.

5. The charge-discharge control method according to claim 1, further comprising estimating the state of charge of the another power receiving element based on an amount of charge in the differential power.

6. The charge-discharge control device according to claim 4, wherein the power reception control device is configured to estimate the state of charge of the another power receiving element based on an amount of charge in the differential power.

* * * * *